United States Patent
Kline, Jr.

(10) Patent No.: US 7,313,453 B2
(45) Date of Patent: Dec. 25, 2007

(54) AUTOMATED SYSTEMS AND METHODS EMPLOYING ATTRIBUTE-BASED BINDING AND CONFIGURABLE RULES FOR SELECTION OF RUN TIME EQUIPMENT

(75) Inventor: Robert C. Kline, Jr., Phoenix, AZ (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 548 days.

(21) Appl. No.: 10/951,200

(22) Filed: Sep. 27, 2004

(65) Prior Publication Data

US 2006/0074505 A1    Apr. 6, 2006

(51) Int. Cl.
*G06F 19/00* (2006.01)

(52) U.S. Cl. ..................................... 700/103
(58) Field of Classification Search .............. 700/18, 700/19, 103, 104, 169, 180
See application file for complete search history.

(56) References Cited

U.S. PATENT DOCUMENTS

| | | |
|---|---|---|
| 5,692,186 A | 11/1997 | Fukuoka et al. |
| 6,091,998 A | 7/2000 | Vasko et al. |
| 6,272,391 B1 | 8/2001 | Maturana et al. |
| 6,397,114 B1 | 5/2002 | Eryurek et al. |
| 6,427,221 B1 | 7/2002 | Maturana et al. |
| 6,430,454 B1 | 8/2002 | Vasko et al. |
| 6,459,944 B1 | 10/2002 | Maturana et al. |
| 6,732,362 B1 | 5/2004 | Lee |
| 6,832,118 B1 | 12/2004 | Heberlein et al. |
| 6,834,370 B1* | 12/2004 | Brandl et al. ............... 715/500 |
| 7,031,782 B2* | 4/2006 | Kappelhoff et al. ........... 700/95 |
| 7,149,595 B2* | 12/2006 | D'Mura ....................... 700/96 |
| 2003/0139936 A1* | 7/2003 | Saucier et al. ................. 705/1 |

OTHER PUBLICATIONS

Partial European Search Report dated Feb. 10, 2006 for PCT Application Serial No. EP05021807, 3 Pages.

H.A. Gabbar, et al. Recipe formal definition language for operating procedures synthesis. Computers and Chemical Engineering, vol. 28, No. 9. Apr. 8, 2004, pp. 1809-1822.

S. Viswanathan, et al. Automating operating procedure synthesis for batch processes: Part I. Knowledge representation and planning framework. Computers and Chemical Engineering, vol. 22, No. 11. Oct. 15, 1998, pp. 1673-1685.

Karsten Schwan, Tom Bihiri, Bruce W. Weide, and Gregor Taulbee, High Performance Operating System Primitives for Robotics and Real-Time Control Systems, ACM Transactions on Computer Systems, vol. 5, No. 3, Aug. 1987, pp. 189-231.

* cited by examiner

*Primary Examiner*—Kidest Bahta
*Assistant Examiner*—Chad Rapp
(74) *Attorney, Agent, or Firm*—Amin Turocy & Calvin LLP; William R. Walbrun

(57) ABSTRACT

The subject invention relates to a system and methodology facilitating automated manufacturing processes in an industrial controller environment, wherein a system is provided for automated industrial processing in one aspect. The system includes a processor that determines a plurality of attributes of a class-based recipe in order to facilitate various automated industrial control operations. A rules component resolves how the attributes are applied by the processor to the automated industrial control operations. The rules component can include a binding component that may also include a binding requirements component and a binding preferences component that are utilized to process the attributes.

28 Claims, 9 Drawing Sheets

Edit Unit Requirement: XXXX — 700

| Tabs: | General | FlowPath Rqmts | Binding Rqmts | Binding Preferences |

710

| Rqmt | Type | Expression |
|---|---|---|
| 1 | Bool Expression | Calculated Efficiency > 80 |
| 2 | Minimize Expr | Days since last CIP |
| 3 | Maximize Expr | Temperature/Capacity |
| 4 | Bool Expression | (Temperature* Pressure) <= 20 |
| 5 | Prfd Recipe Phase | AGITATE |
| 6 | Prfd Attribute | TEMPERATURE |
| 7 | Avoid Attribute | PRESSURE |
| 8 | Avoid Recipe Phase | RECIRC |

[ Add Preference ] [ Edit Expression ] [ Delete Preference ]

[ OK ] [ Cancel ] [ Apply ] [ Help ]

Fig. 7

AUTOMATED SYSTEMS AND METHODS EMPLOYING ATTRIBUTE-BASED BINDING AND CONFIGURABLE RULES FOR SELECTION OF RUN TIME EQUIPMENT

TECHNICAL FIELD

The subject invention relates generally to industrial control systems, and more particularly to a system and methodology that enables industrial automation equipment to be automatically selected at run time based upon attribute declarations and configurable rules for automatically determining available equipment with respect to such declarations.

BACKGROUND OF THE INVENTION

Industrial controllers are special-purpose computers utilized for controlling industrial processes, manufacturing equipment, and other factory automation, such as data collection or networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often such as in the case of automobiles, complex assemblies can be manufactured with high technology robotics assisting the industrial control process.

In many automated processes, including the basic production of commodities such as food, beverages, and pharmaceuticals, complex state logic is often designed and programmed by Systems Engineers or provided in some cases by automated equipment manufacturers. This logic is often programmed with common PLC ladder logic or higher level languages supported by Sequential Function Charts. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

In some batch systems for automating production processes, current batch products can aggregate Units for production into Unit Classes, where a Unit Class defines the global common functionality of all Units that are members of the Unit Class. This allows for the construction of "class-based" recipes, built against a Unit Class or Classes. When building a class based recipe, a recipe author is generally limited to referencing only the functionality common to all instances of the Unit Class. This generally results in the class based recipe being able to run against all instances of the Unit Class. The "common functionality" that can be referenced across all members of a Unit Class by class based recipes are Recipe Phases and Unit Tag Classes. However, variations in the properties (attributes) of the individual reactors are great enough that the set of properties (attributes) that are common to all instances of the class are limited. Recipe Phases can be employed as "steps" inside of Unit Operation Sequential Function Charts (SFCs), for example. Unit Tag Classes can be referenced by Transition Expressions on Transitions inside of class based Unit Procedure and Unit Operation SFCs.

With respect to many applications however, the set of functionality common across all instances of a unit class may be so small as to not be useful. For example, a plant may have a large number of similar units that it considers to be reactors. Thus, the set of Recipe Phases and Unit Tag Classes that are supported across all instances of the reactor class may be so small as to not allow for the creation of useful class based recipe structures. However, there is likely to be significant commonality between some reactors that does not extend to the entire set of reactors. For example, some subset of reactors may contain agitators. Some other subset of reactors may contain temperature sensors. Thus, in some cases the current concept of Unit Class commonality only recognizes global commonality, wherein the user loses the benefit of being able to build class based recipes that utilize subsets of commonality. Also, there may be attributes of a Unit, such as materials of construction, or temperature that make it acceptable, unacceptable, desirable, or undesirable for use with certain recipes.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to a system and methodology that enables industrial automation equipment to be automatically selected at run time based upon attribute declarations that define properties or features that can be employed to increase productivity and efficiency of an automated industrial environment. In one aspect, components are provided that allow users to build recipes that reference a subset of functionality that exists within members of a Unit Class. Other components then enable users to restrict a set of members of the Unit class on which a class based recipe can run, based on "attributes" of the Units. This can include receiving and processing binding requirements or rules that describe how the attributes are to be applied to a desired industrial process such as selecting manufacturing equipment based upon the attribute defined for a given class of equipment. Furthermore, other components allow users to specify an algorithm or procedure for determining the most "preferred" unit to be used by a recipe when more than one member of a Unit Class satisfies the restriction requirements.

By defining such attributes within a class-based recipe, and applying various binding and preference criteria to the attributes, various industrial processes can be enhanced. For example, an attribute such as temperature may be defined with associated rules for controlling a process in view of the selected attribute. In this example, a plurality of reactors may be available that can execute a given recipe, whereby a rule is defined to select the "warmest reactor" from the subset of available reactors. In this manner, by selecting the warmest unit, energy savings can be realized since the attribute "temperature" is employed to use an already heated unit for production while mitigating waste associated with randomly selecting any available and possibly lower-temperature unit from the class. As can be appreciated, a plurality of such attributes may be defined. For example, these may include pressure considerations, maintenance events, service events, chemistry restrictions such as employment of lined reactors, limiting simpler recipes from running on multi-functional equipment, mitigating cleaning operations by sequencing production units, and so forth.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 7 is a diagram illustrating a user interface for entering binding preferences in accordance with an aspect of the subject invention.

DETAILED DESCRIPTION OF THE INVENTION

The subject invention relates to a system and methodology facilitating automated manufacturing processes in an industrial controller environment. In one aspect, a system is provided for automated industrial processing. The system includes a processor that determines a plurality of attributes of a class-based recipe in order to facilitate various automated industrial control operations. A rules component resolves how the attributes are applied by the processor to the automated industrial control operations. The rules component can include a binding component that may also include a binding requirements component and a binding preferences component that are utilized to process the attributes. By employing respective attributes and rules, the subject invention can more efficiently exploit conditions outside of merely selecting an available piece of equipment for operations yet likely select a more suitable piece of equipment to perform a desired manufacturing task.

It is noted that as used in this application, terms such as "component," "model," "object," "class," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

Figure 1:
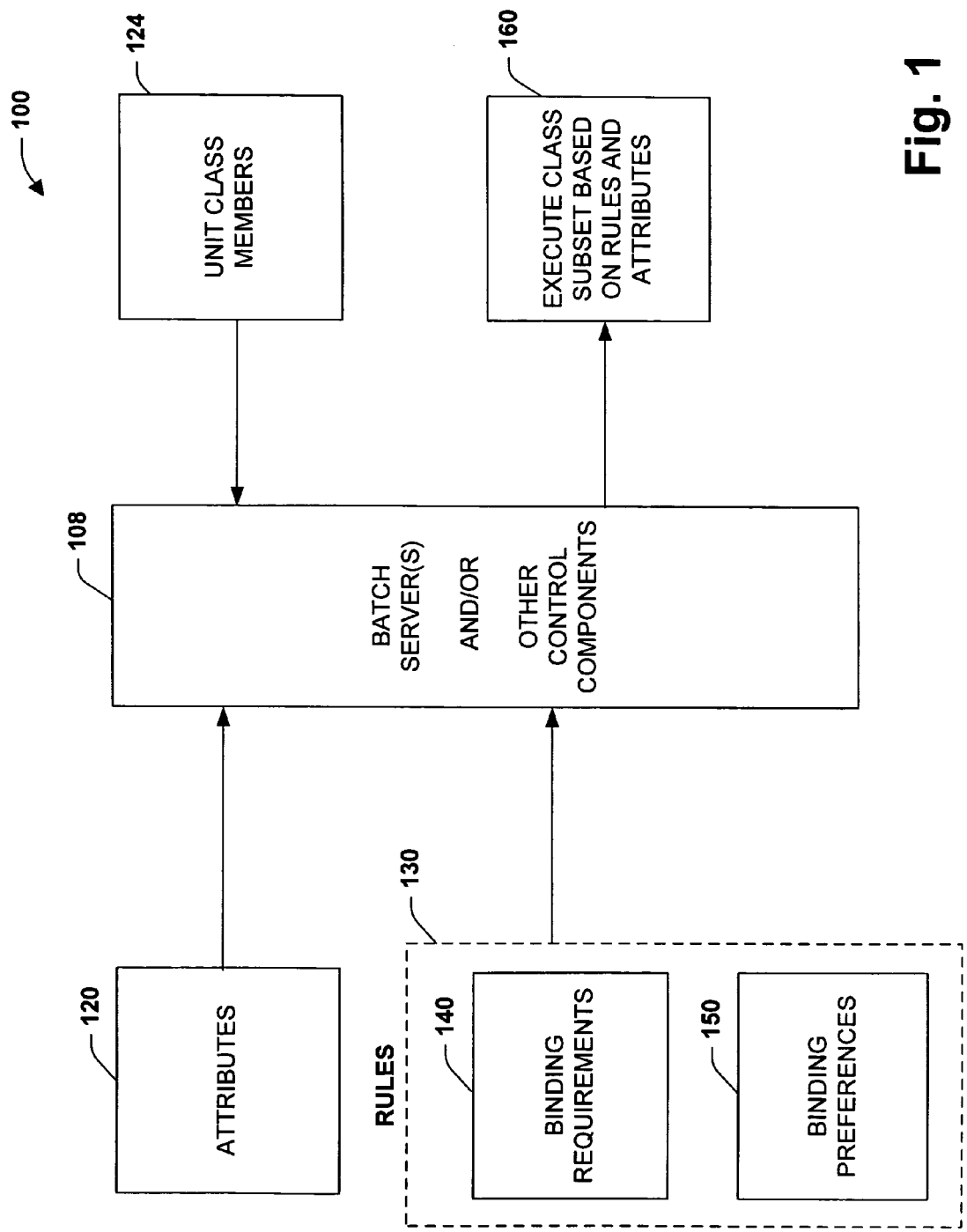
FIG. 1 is a schematic block diagram illustrates an attribute processing and binding system in accordance with an aspect of the subject invention.

Referring initially to FIG. 1, a system 100 illustrates attribute processing and binding in accordance with an aspect of the subject invention. The system 100 includes a controller 108 (or controllers, processors, servers and so forth) that processes one or more attributes 120 that can be specified as part of a recipe, batch or program. The attributes 120 describe a subset of functionality that applies to members of a class at 124 (e.g., equipment employed for a batch operation modeled as an object class). For instance, these attributes 120 may refer to a parameter such as pressure or temperature that can then be employed by the controller 108 to select available equipment or components that are members of the class 124. In one example, recipe chemistry can be declared as an attribute 120, whereby one or more rules 130 can be declared that control how the attribute is applied. Proceeding with this example, the rule 130 could specify to use glass-lined containers only from a larger set of containers in view of the required chemistry for the associated process.

In another example, the rule 130 could select a warmest reactor from an available set of reactors when performing a batch operation. These rules 130 can be provided as binding requirements 140 (e.g., Boolean expressions), wherein such rules are entered as part of an equipment or recipe editor for example. Another component includes binding preferences 150 to resolve conflicts between the binding requirements 140—if they exist. For instance, if the rule 130 were to select the warmest reactor, and two reactors were measured the warmest and having the same temperature, the binding preference 150 can be employed (e.g., select the warmest reactor that is furthest away from a maintenance event). The attributes 120 and rules 130 are employed by the controller 108 to resolve which members or subset of the class 124 are to be executed at 160. Also, the controller 108 can include one or more batch servers and/or other control components (e.g., I/O modules, communications modules) coupled via a network connection to affect operations within the controller 108. Such control components can include controllers, computers, batch servers or processors, other modules, and so forth. It is to be appreciated that the concept of "Attributes", and "Rules" involving "Binding Requirements" and "Binding Preferences" can be employed for the purpose of selection of any type of object in addition to example objects such as "Units" and "Equipment Modules" described herein.

As will be described in more detail below, several components such as tag classes, equipment editors, recipe editors, and batch processor or server components can be modified to provide the attribute-based binding and equipment selection in accordance with the subject invention. The equipment editor generally interacts with an area model that defines an equipment association between a container that holds inventory and an equipment module that has a physical association with the container, whereas the recipe editor can be employed for manipulating recipes that describe the necessary components of a manufacturing process. The batch server can be a networked computer that executes the recipe while interacting with control systems to produce various commodities associated with the recipe In general, the above considerations can include providing a component to allow a user to build recipes that reference a subset of functionality that exists within the members of the Unit Class 124, providing a component to allow users to restrict the set of members of the Unit class on which a class based recipe can run, based on "attributes" 120 of the Units, and providing a component to allow the user to specify an algorithm for determining the most "preferred" unit to be used by a recipe when more than one member of a Unit Class satisfies the restriction requirements. Before proceeding the following definitions may be applied:

Attribute

Attributes take the place of what has previously been referred to as Tag Classes. Attributes can be associated with Unit Classes and Recipe Phases. Attribute Tags can be built against Units and Equipment Phases and can be used to access the value of an Attribute for a specific piece of equipment.

Attribute Tag

Attribute Tags is a refinement of the concept of Tags. An Attribute Tag can be built against a Unit or Equipment Phase. Each Attribute Tag can be associated with an Attribute (formerly Tag Class). The Attribute Tag can be the component for retrieving the Attribute value of the piece of the equipment with which the Attribute Tag is associated.

Binding Requirement

An attribute applied to a Unit Requirement object within a recipe. When attempting to bind a Unit Requirement during recipe execution, the entire set of Binding Requirements defined on the Unit Requirement is evaluated against each potential binding candidate. Units that are unable to meet every Binding Requirement defined on the Unit Requirement are removed as potential binding candidates for the Unit Requirement.

Binding Preference

An attribute applied to a Unit Requirement object within a recipe. Binding Preference Attributes can be used to sort legal binding candidates for the Unit Requirement into a preferred usage order.

Boolean Expression

A Boolean expression is an expression that evaluates to a value of either TRUE or FALSE. An example of a Boolean expression would be "TEMPERATURE<20.3".

Custom Attribute

A Custom Attribute is an Attribute defined by a customer as part of their Area Model.

Custom Unit Attribute

A Custom Unit Attribute is a Custom Attribute that can be assigned to Unit Classes and for which Unit Attribute Tags can be built against Units.

Dynamic Tag

A Dynamic Tag is a Tag that is configured to access data in an external data server. The assumption is that the external data represents a dynamic changing value.

Equipment Phase Attribute

A Unit Attribute is an Attribute that can be associated with Recipe Phases and for which Equipment Phase Attribute Tags can be built against Equipment Phases. The Equipment Phase Attribute replaces the functionality of Tag Classes, but refines them to being specific to Equipment Phases.

Global Binding Requirement

A Binding Requirement defined within the Equipment Editor. Global Binding Requirements are automatically applied to every Unit Requirement within a recipe that is loaded by a Recipe Editor or Batch Server using the Area Model in which the Global Binding Requirement is defined. This saves the recipe editor the effort of having to manually add the Binding Requirement to every Unit Requirement in every recipe.

Global Unit Attribute

A Global Unit Attribute is a Custom Unit Attribute that has been configured to be automatically applied to all Unit Classes defined within the Area Model. This saves the Area Model author the effort of having to manually assign the Custom Unit Attribute to every Unit Class.

Maximize Expression

A Maximize Expression is an expression that evaluates to either an integer or real value. It is used as a form of Binding Preference. Legal bind targets for which the expression evaluates to a higher value can be considered more "preferred" bind targets than those for which the expression evaluates to a lower value.

Minimize Expression

A Minimize Expression is an expression that evaluates to either an integer or real value. It is used as a form of Binding Preference. Legal bind targets for which the expression evaluates to a lower value can be considered more "preferred" bind targets than those for which the expression evaluates to a higher value.

Recipe Phase Inclusion

A Recipe Phase Inclusion is an object that is either a Binding Requirement or a Binding Preference. When used as a Binding Requirement, the object is a "demand" for a Unit with support for the specified Recipe Phase. When used as a Binding Preference, the object is a "request" for a Unit with support for the specified Recipe Phase.

Recipe Phase Exclusion

A Recipe Phase Exclusion is an object that is either a Binding Requirement or a Binding Preference. When used as a Binding Requirement, the object is a "demand" for a Unit that lacks support for the specified Recipe Phase. When used as a Binding Preference, the object is a "request" for a Unit that lacks support for the specified Recipe Phase.

Standard Attribute

A Standard Attribute is an Attribute that is defined by the Batch software and used for internal Batch software functions.

Standard Unit Attribute

A Standard Unit Attribute is a Standard Attribute that is applied to Unit Classes and for which Unit Attribute Tags are built against Units.

Static Tag

A Static Tag is a Tag that is configured to represent a constant unchanging value defined within the Equipment Editor.

Unit Attribute

A Unit Attribute is an Attribute that can be associated with Unit Classes and for which Unit Attribute Tags can be built against Units. The Unit Attribute replaces the functionality provided by Unit Tag Classes.

Unit Attribute Inclusion

A Unit Attribute Exclusion is an object that is either a Binding Requirement or a Binding Preference. When used as a Binding Requirement, the object is a "demand" for a Unit that provides an Attribute Tag for support of the specified Unit Attribute. When used as a Binding Preference, the object is a "request" for a Unit that provides an Attribute Tag for support of the specified Unit Attribute.

Unit Attribute Exclusion

A Unit Attribute Inclusion is an object that is either a Binding Requirement or a Binding Preference. When used as a Binding Requirement, the object is a "demand" for a Unit that lacks an Attribute Tag for support of the specified Unit Attribute. When used as a Binding Preference, the object is a "request" for a Unit that lacks an Attribute Tag for support of the specified Unit Attribute.

Unit Attribute Tag

A Unit Attribute Tag is a tag that represents the value of a Unit Attribute for a specific Unit. The Unit Attribute Tag replaces the functionality provided by Unit Tags.

Figure 2:
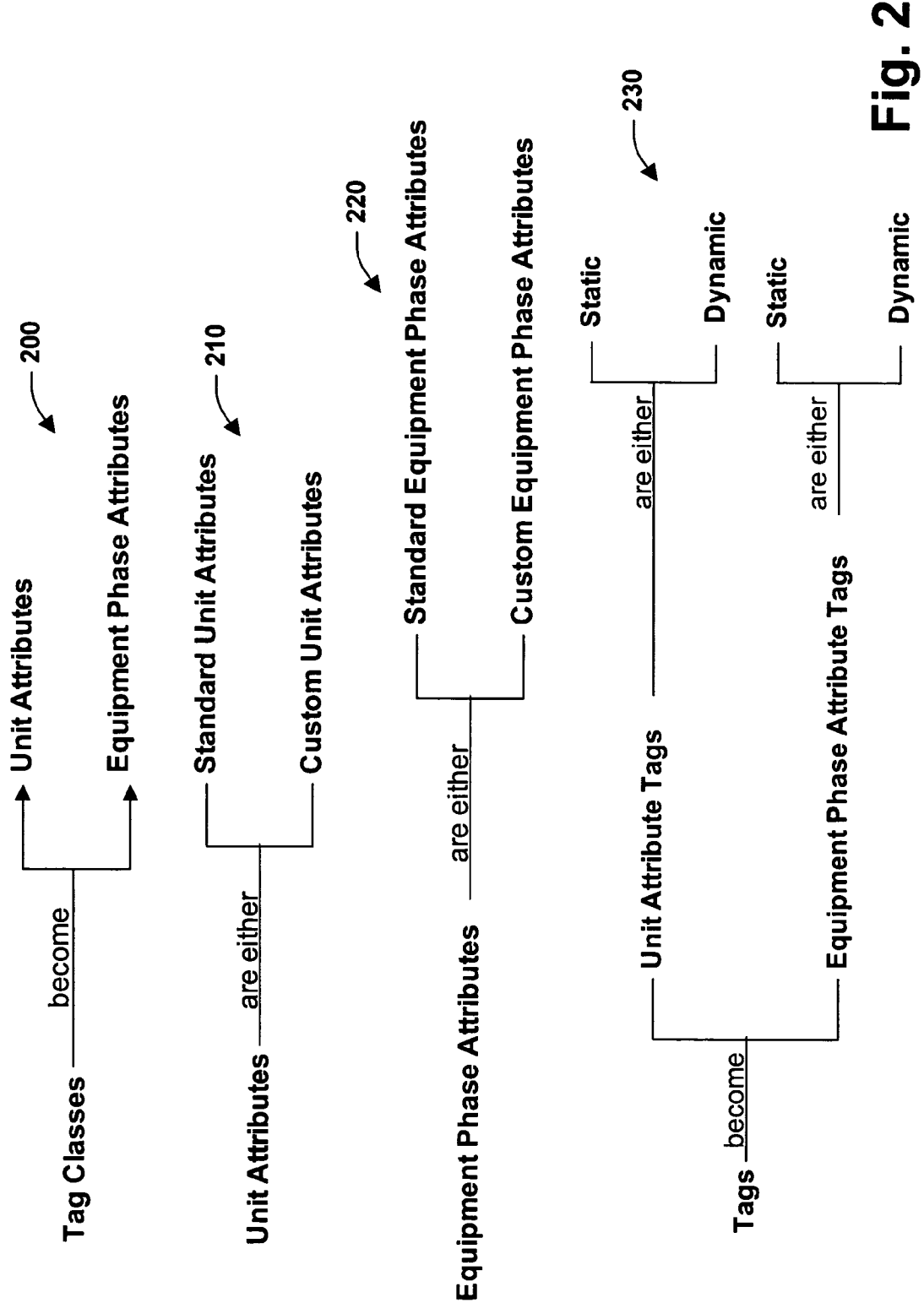
FIG. 2 illustrates equipment editor enhancements in accordance with an aspect of the subject invention.
Figure 3:
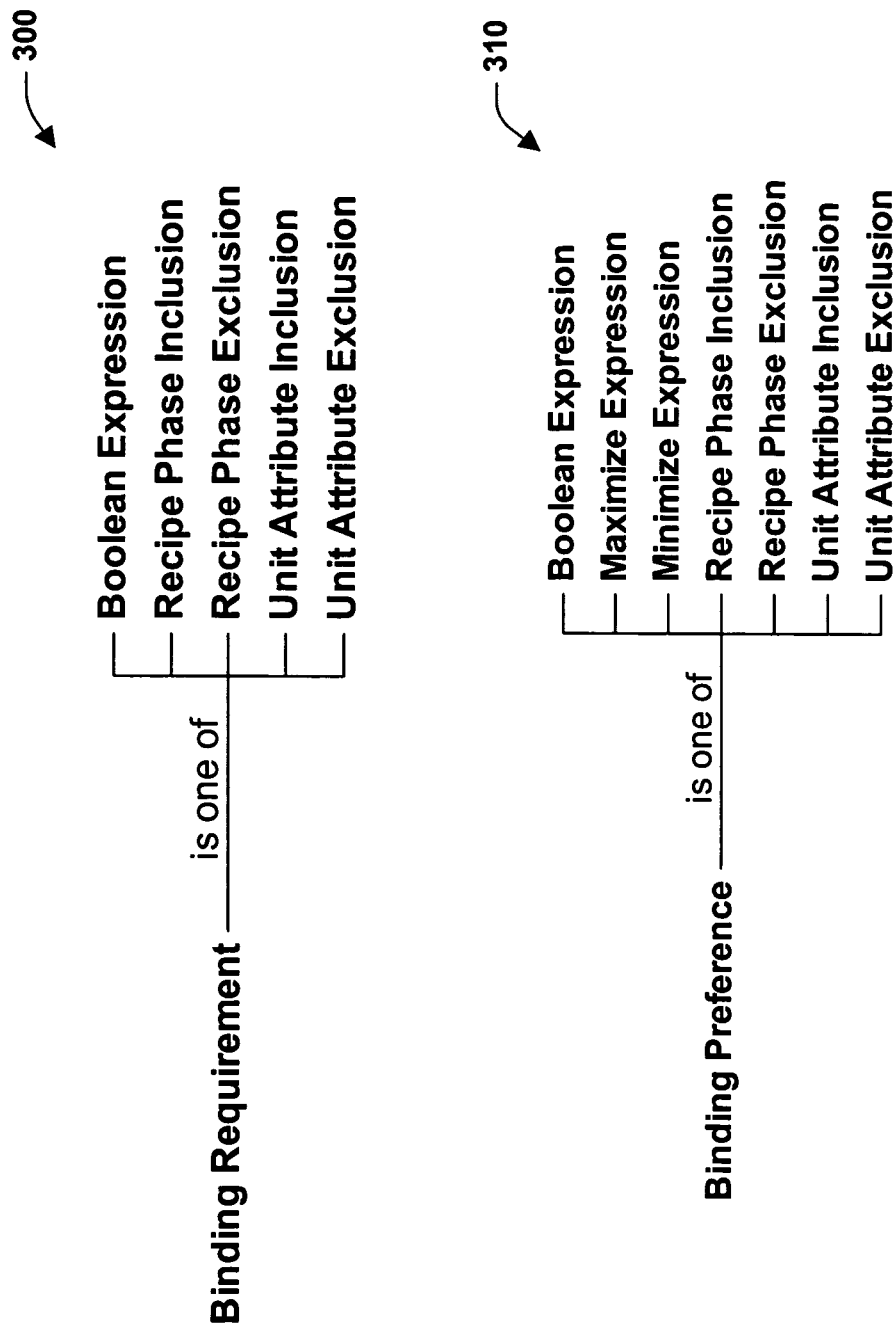
FIG. 3 illustrates recipe editor enhancements in accordance with an aspect of the subject invention.
Figure 4:
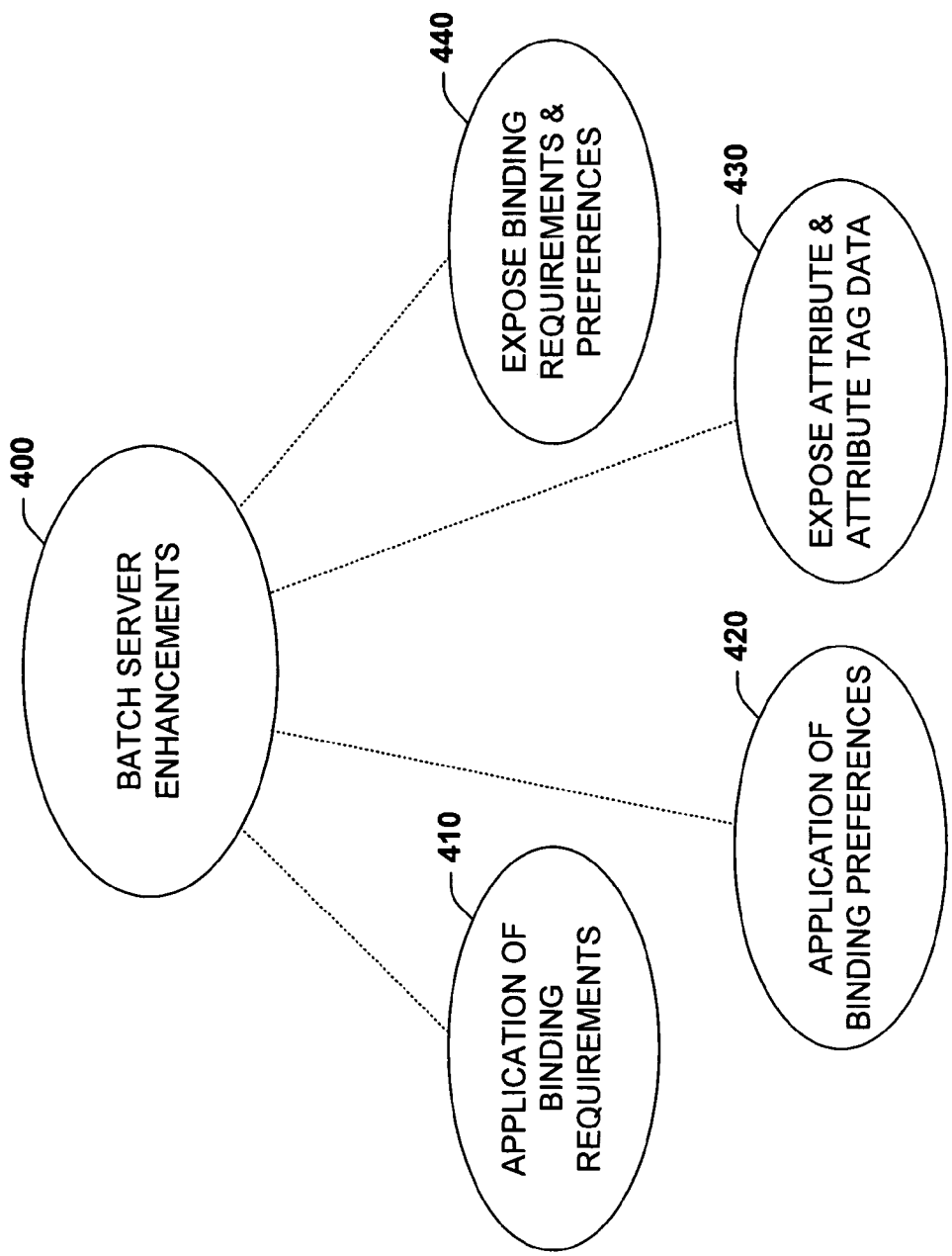
FIG. 4 illustrates batch server enhancements in accordance with an aspect of the subject invention.

FIGS. 2-4 illustrate equipment editor, recipe editor, and batch server enhancements for providing attribute binding in accordance with the subject invention. Referring now to FIG. 2, equipment editor enhancements are illustrated in accordance with an aspect of the subject invention. At 200, Tag Classes can be defined as Attributes, and separated into Unit Attributes, and Equipment Phase Attributes. At 210 Unit Attributes can be organized into Standard and Custom Attributes. Standard Attributes are those attributes used by functions within the product software. Custom Attributes are defined by customers for their own use. Examples of Standard Unit Attributes include CAPACITY, and so forth. Examples of Custom Unit Attributes include MATERIALS OF CONSTRUCTION, CIP STATUS, LEVEL, and so forth.

At 230, Equipment Phase Attributes can be separated into Standard and Custom Attributes. Standard Attributes are used by functions within product software, while Custom Attributes will be those defined by customers for their own use. At 240 Tags can be defined as Attribute Tags, and separated into Unit Attribute Tags and Equipment Phase Attribute Tags. When defining an Attribute Tag, users can configure the tag as being a Dynamic Tag (an external data source) or a Static Tag (a constant value).

Static Attribute Tags are used to represent unchanging characteristics of equipment. MATERIALS OF CONSTRUCTION is an example of a Unit Attribute that would typically be represented with a Static Unit Attribute Tag. Dynamic Attribute Tags are used to represent changing characteristics of equipment. TEMPERATURE is an example of a Unit Attribute that would typically be represented with a Dynamic Unit Attribute Tag.

The Equipment Editor can also be enhanced to permit building of Global Binding Requirements. Global Binding Requirements can be constrained to be of a Boolean Expression type. A Boolean Expression that represents a Global Binding Requirement is capable of referencing Global Unit Attributes. Boolean Expression objects will also be capable of referencing key values located in the recipe header data, such as BATCH_SIZE. At runtime, Units for which the Boolean Expression evaluates to FALSE are not considered legal bind targets.

FIG. 3 illustrates recipe editor enhancements in accordance with an aspect of the subject invention. A recipe editor (not shown) can be enhanced to permit the building of Binding Requirements associated with class based Unit Requirements. A Binding Requirement can be one of five types of objects at 300. A Boolean Expression that represents a Binding Requirement is capable of referencing Unit Attributes assigned to the Unit Class associated with the Unit Requirement. Boolean Expression objects are also capable of referencing key values located in recipe header data, such as BATCH_SIZE. At runtime, Units for which the Boolean Expression evaluates to FALSE are not considered legal bind targets.

A Recipe Phase Inclusion Binding Requirement mandates that the Unit Requirement is bound to a Unit that provides support for a specified Recipe Phase. When this type of Binding Requirement is created, the recipe author is now able to use the specified Recipe Phase in recipes built against the Unit Requirement. A Recipe Phase Exclusion Binding Requirement mandates that the Unit Requirement is bound to a Unit that does not support a specified Recipe Phase. This type of Binding Requirement is primarily used to prevent a recipe from using Units with unneeded capabilities.

A Unit Attribute Inclusion Binding Requirement mandates that the Unit Requirement is bound to a Unit that supports a specified Unit Attribute. When this type of Binding Requirement is created, the recipe author is now able to reference the specified Unit Attribute from transitions inside of Unit Operations and Unit Procedures associated with the Unit Requirement. A Unit Attribute Exclusion Binding Requirement mandates that the Unit Requirement is bound to a Unit that does not support a specified Unit Attribute. This type of binding requirement would primarily be used to prevent a recipe from using Units with unneeded instrumentation.

It is noted that when a lower level recipe procedure is inserted inside of a higher level recipe procedure, Binding Requirements may employ a "bubble-up" algorithm. For example, if a Unit Operation recipe has a Binding Requirement that requires a MATERIALS OF CONSTRUCTION value of STAINLESS STEEL, then this Binding Requirement should "bubble-up" to the Unit Procedure level if the Unit Operation is inserted into a Unit Procedure recipe. Some form of conflict resolution can be provided in the event that a Binding Requirement at a higher recipe level conflicts with a Binding Requirement in a lower level recipe being inserted into the higher level recipe's structure.

The recipe editor can also be enhanced to permit the building of Binding Preferences associated with class based Unit Requirements. A Binding Preference can be one of seven types of objects as depicted at 310. A Boolean Expression that represents a Binding Preference is capable of referencing Unit Attributes assigned to the Unit Class associated with the Unit Requirement. Boolean Expression objects will also be capable of referencing key values located in recipe header data, such as BATCH_SIZE. At runtime, Units for which the Boolean Expression evaluates to TRUE are considered preferred binding candidates to those Units for which the Boolean Expression evaluates to FALSE.

A Maximize Expression that represents a Binding Preference is an expression that evaluates to an integer or real value. A Maximize Expression is capable of referencing Unit Attributes assigned to the Unit Class associated with the Unit Requirement. Maximize Expressions are also capable of referencing key values located in recipe header data, such as BATCH_SIZE. At runtime, Units for which the Maximize Expression evaluates to a higher value can be considered preferred binding candidates to those Units for which the Maximize Expression evaluates to a lower value.

A Minimize Expression that represents a Binding Preference is an expression that evaluates to an integer or real value. A Minimize Expression is capable of referencing Unit Attributes assigned to the Unit Class associated with the Unit Requirement. Minimize Expressions are also capable of referencing key values located in recipe header data, such as BATCH_SIZE. At runtime, Units for which the Minimize Expression evaluates to a lower value are considered preferred binding candidates to those Units for which the Minimize Expression evaluates to a higher value.

A Recipe Phase Inclusion Binding Preference specifies a Recipe Phase. Units that provide support for the specified Recipe Phase are considered preferred binding candidates to Units that do not. A Recipe Phase Exclusion Binding Preference specifies a Recipe Phase. Units that do not provide support for the specified Recipe Phase are considered preferred binding candidates to Units that do. This type of Binding Preference would primarily be used to cause a recipe to avoid running on Units with unneeded capabilities.

A Unit Attribute Inclusion Binding Preference specifies a Unit Attribute. Units that provide support for the specified Unit Attribute are considered preferred binding candidates to Units that do not. A Unit Attribute Exclusion Binding Preference specifies a Unit Attribute. Units that do not provide support for the specified Unit Attribute are considered preferred binding candidates to Units that do. This type of Binding Preference is primarily used to cause a recipe to avoid running on Units with unneeded instrumentation. Some form of conflict resolution can be provided in the event that a Binding Preference at a higher recipe level conflicts with a Binding Preference in a lower level recipe.

Referring now to FIG. 4, batch server enhancements 400 are illustrated in accordance with an aspect of the present invention. At 410, application of Binding Requirements are considered. When the Batch Server attempts to bind a Unit Requirement, it can first trim the list of legal bind target candidates using existing flow path algorithms. If at least one legal bind target remains after executing these algorithms, then the Binding Requirements will be evaluated against all remaining bind targets. Any bind target that does not meet ALL of the Binding Requirements will be removed from the list of legal bind targets. If no legal bind targets remain after trimming the legal bind targets, then appropriate error handling measures will be taken.

At 420, Application of Binding Preferences are considered. If more than one binding candidate remains after trimming the set of legal candidates, then the remaining set can be sorted into a "preferred" order. Binding Preferences can be used for this purpose. Whichever Binding Preference is defined to be the primary sort will be used as such, the secondary sort used as such, and so on.

Figure 5:
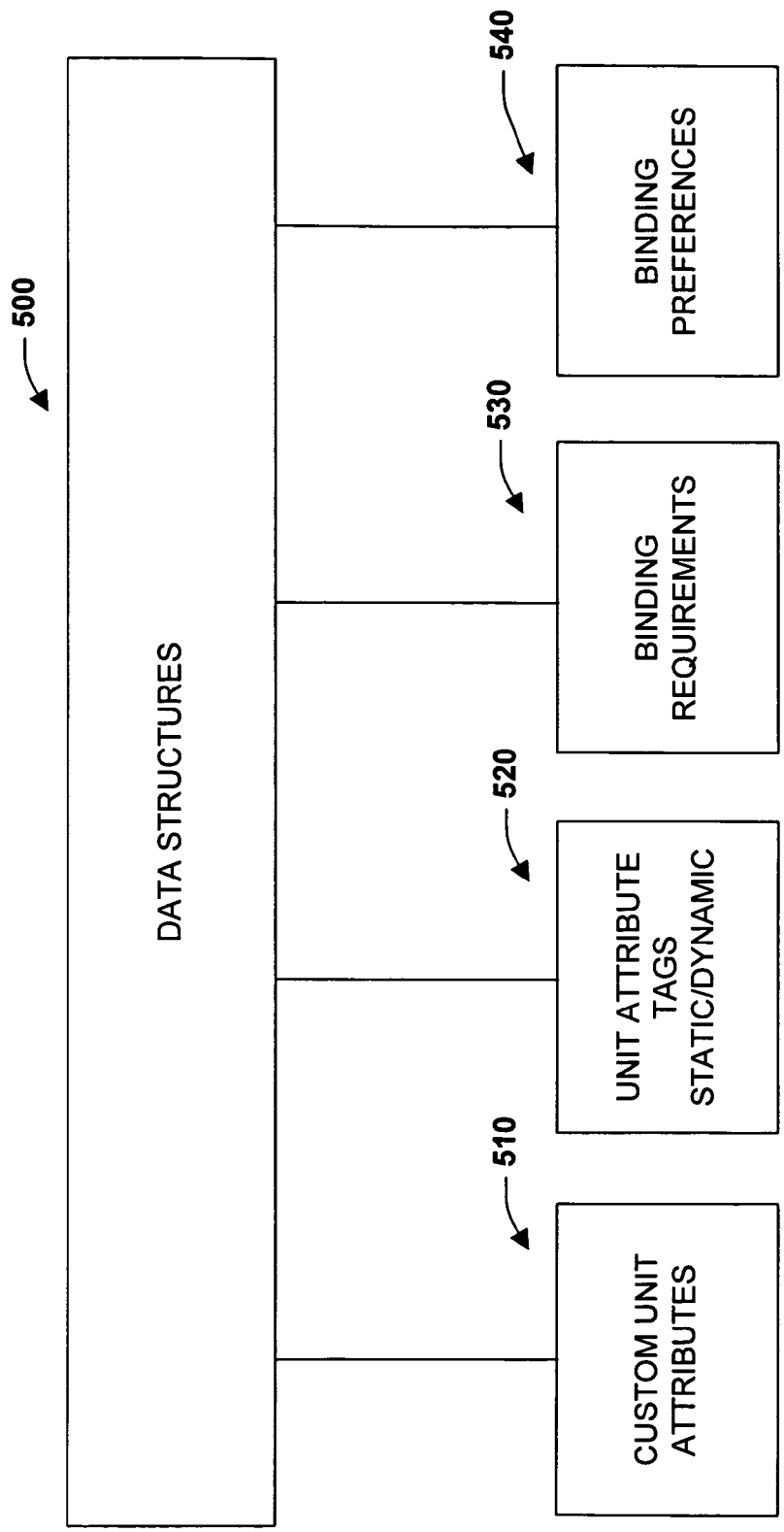
FIG. 5 illustrates an exemplary data structure in accordance with an aspect of the subject invention.

At 430, Exposing of Attribute and Attribute Tag Data is considered. The Batch Server can expose Attribute and Attribute Tag data to external clients through new data items. The following sets of data items can be created:

A single data item to expose the set of Custom Unit Attributes defined in an Area Model A set of data items (1 per Unit Class) to expose the Unit Attributes assigned to a Unit Class A set of data items (1 per Unit) to expose the Unit Attribute Tag values for a Unit A single data item to expose the set of Equipment Phase Attributes defined in the Area Model A set of data items (1 per Recipe Phase) to expose the Equipment Phase Attributes assigned to a Recipe Phase A set of data items (1 per Equipment Phase) to expose the Equipment Phase Attribute Tag values for an Equipment Phase At 440, Exposing of Binding Requirements and Binding Preferences are considered. The Batch Server can be enhanced to expose Binding Requirements and Binding Preferences on Unit Requirements contained within instantiated recipes. The following sets of data items can be employed as an example:

A data item per Batch Procedure to expose the set of Unit Requirements defined within A data item per Unit Procedure to expose the Unit Requirement defined within A data item per Unit Operation to expose the Unit Requirement defined within A data item per Unit Requirement to expose its set of Binding Requirements A data item per Unit Requirement to expose its ordered set of Binding Preferences Turning to FIG. 5, an exemplary data structure 500 is illustrated in accordance with an aspect of the present invention. At 510, Custom Unit Attributes can be provided.

Generally, the user defines Custom Unit Attributes in the Equipment Editor. When building Unit Classes, the user will select which Unit Attributes apply to the specific Unit Class. For each Unit Attribute, the following information may be configured:

| Field | Description |
| --- | --- |
| Attribute Name | This is a string is the name of the Attribute. Legal characters will follow the naming conventions used for other Area Model objects. |
| Type | The data type of the Attribute, either Enumeration, Real, Integer, or String. |
| Enumeration Set | This field is applicable when the Type is "Enumeration". This contains the name of the Enumeration set that completes the Type definition of the Unit Attribute. |
| Engineering Units | The engineering units for Attribute Value Tags representing this Attribute. |
| Default | The default value to be used when a Unit's Attribute Value Tag representing this Attribute is configured to be a Static Unit Attribute Tag. |
| Description | A string that contains a description of the Attribute. |
| ID | A unique integer value that identifies the Attribute. |
| Global | A flag indicating if the Unit Attribute is to be considered a Global Unit Attribute. |

At 520, Unit Attribute Tags are provided that include static and dynamic tags.

When configuring a Unit, the Equipment Editor can create one Unit Attribute Tag for each Global Unit Attribute and one tag for each Unit Attribute associated with the Unit's Unit Class. Each Attribute Tag can be configured as being either a Dynamic or Static Tag. When configuring a Static Unit Attribute Tag, the static value can be initialized to the default specified in the Unit Attribute's Default value. The user can change the value of the Static Unit Attribute Tag within the Equipment Editor. The "static" nature of the Unit Attribute Tag refers to its unchanging value in the Batch Server. The data type of the Static Unit Attribute Tag is controlled by the Type and Enumeration Set fields of the Unit Attribute's configuration data. Dynamic Unit Attribute Tags allow the Batch Server to access an external data source for the runtime value of a specific Unit's Attribute.

At 530, the Equipment Editor permits the Area Model author to build a list of Global Binding Requirements. These Global Binding Requirements are the Boolean Expression type and are applied to Unit Requirements within the recipes. The Recipe Editor will permit a recipe author to build a list of Binding Requirements on every Unit Requirement object, if desired. Each binding requirement can be one of five types of objects listed at 300 of FIG. 3. At 540, the Recipe Editor permits a recipe author to build an ordered list of Binding Preferences on each Unit Requirement object, if desired. Each Binding Preference can be one of seven types of objects listed at 310 of FIG. 3.

Figure 6:
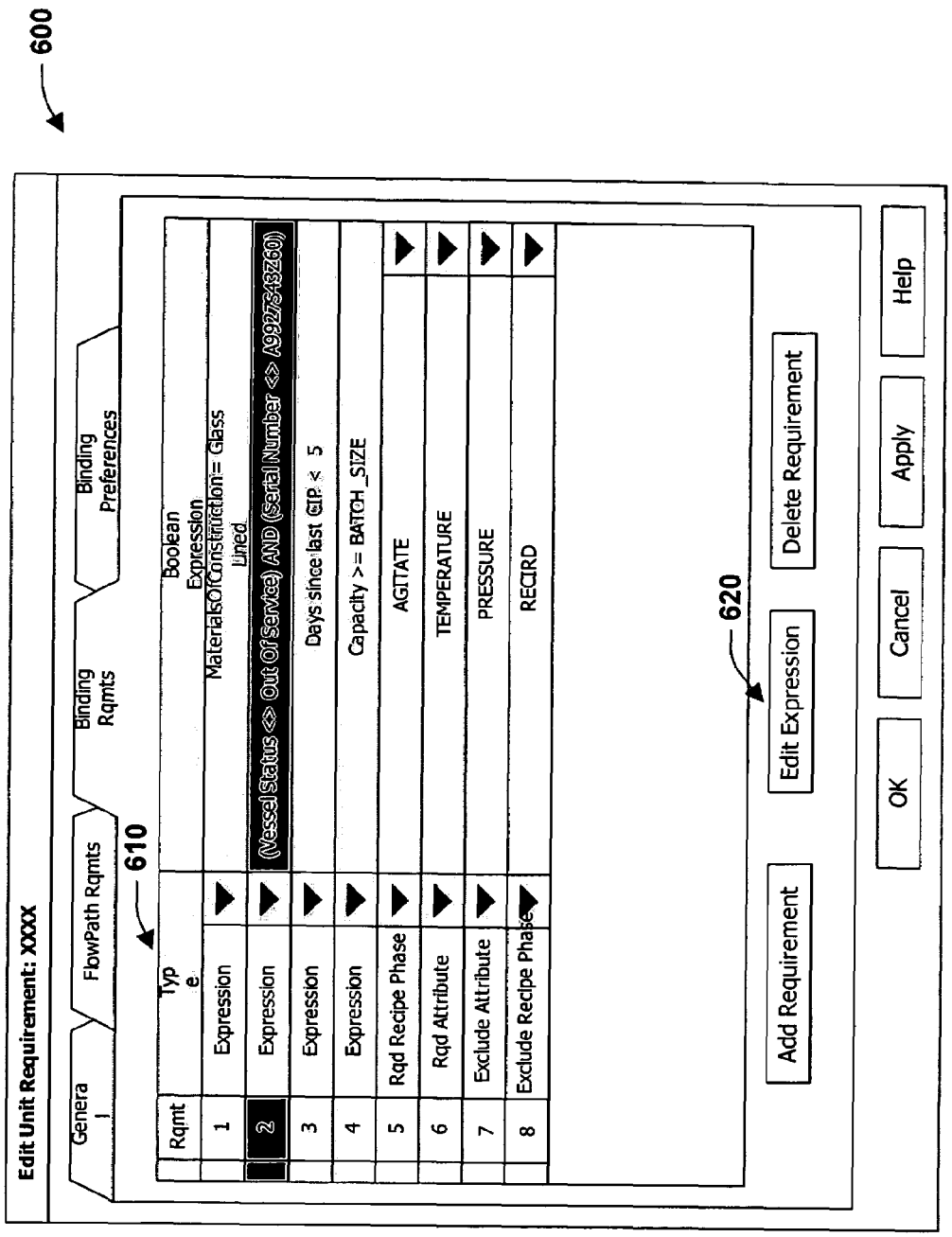
FIG. 6 is a diagram illustrating a user interface for entering binding requirements in accordance with an aspect of the subject invention.

Referring now to FIG. 6, a user interface 600 for entering binding requirements is illustrated in accordance with an aspect of the subject invention. This interface 600 allows users to specify Binding Requirements for the Unit Requirement. Each Binding Requirement is presented as a row in a table; buttons underneath the table allow the user to add and remove requirements. A "Type" column 600 in the table allows the user to specify the type of requirement. The five example "types" are:

1. Boolean Expression: The requirement is a Boolean Expression that can reference Unit Attributes of the Unit Requirement's Unit Class as well as specific recipe header data such as BATCH_SIZE.
2. Recipe Phase Inclusion: The requirement is for support within the Unit for the specified Recipe Phase. Adding this requirement will make it possible to use this Recipe Phase within class based recipes built against this requirement, even if the Recipe Phase is not globally supported across all instances of the class.
3. Recipe Phase Exclusion: The requirement is for selection of a Unit that does NOT support the specified Recipe Phase. This is a way of preventing the recipe from using a Unit with unneeded capabilities.
4. Unit Attribute Inclusion: The requirement for support within the Unit for the specified Unit Attribute. Adding this requirement will make it possible to use the Unit Attribute in transition expressions built at the Unit Operation and Unit Procedure recipe levels.
5. Unit Attribute Exclusion: This requirement is for a Unit that does not have a Unit Attribute Tag that supports the specified Unit Attribute. This is useful for preventing the recipe from running on Units with unneeded instrumentation.

The "Edit Expression" button 620 brings up an expression editor that assists the user in building a Boolean Expression for "Expression" type binding requirements. If the currently selected Binding Requirement is not an expression, then the "Edit Expression" button can be disabled. Global Binding Requirements defined within the Area Model should be displayed as disabled rows in the table. This would allow the recipe author to view the Global Binding Requirements that can affect the binding selection process.

Turning now to FIG. 7, a user interface 700 for entering binding preferences is illustrated in accordance with an aspect of the subject invention. This page 700 allows users to specify Binding Preferences for the Unit Requirement. Each Binding Preference is presented as a row in a table; buttons underneath the table allow the user to add and remove Binding Preferences, as well as promote/demote the sort order of Binding Preferences. A "Type" column 710 in the table allows the user to specify the type of Binding Preference. The seven example "types" of Binding Preferences are:

1. Boolean Expression: The requirement is a Boolean Expression that can reference Unit Attributes of the Unit Requirement's Unit Class as well as specific recipe header data such as BATCH_SIZE. Unit instances for which the Binding Preference expression evaluates to TRUE are considered "more desirable" binding targets than those for which the expression evaluates to FALSE.
2. Minimize Expression: The Binding Preference is an expression that evaluates to an integer or real value. Unit Instances on which the Binding Preference expression evaluates to a lower value are considered "more desirable" binding targets than those for which the expression evaluates to a higher value.
3. Maximize Expression: The Binding Preference is an expression that evaluates to an integer or real value. Unit Instances on which the Binding Preference expression evaluates to a higher value are considered "more desirable" binding targets than those for which the expression evaluates to a lower value.
4. Recipe Phase Inclusion: The Binding Preference is for Units that support the specified Recipe Phase.
5. Recipe Phase Exclusion: The Binding Preference is for Units that do not support the specified Recipe Phase. This is useful for attempting to avoid Units with unneeded capabilities.
6. Unit Attribute Inclusion: The Binding Preference is for Units that have a Unit Attribute Tag that supports the specified Unit Attribute.
7. Unit Attribute Exclusion: The Binding Preference is for Units that do not have a Unit Attribute Tag that supports the specified Unit Attribute. This is useful for attempting to avoid Units with unneeded instrumentation.

Figure 8:
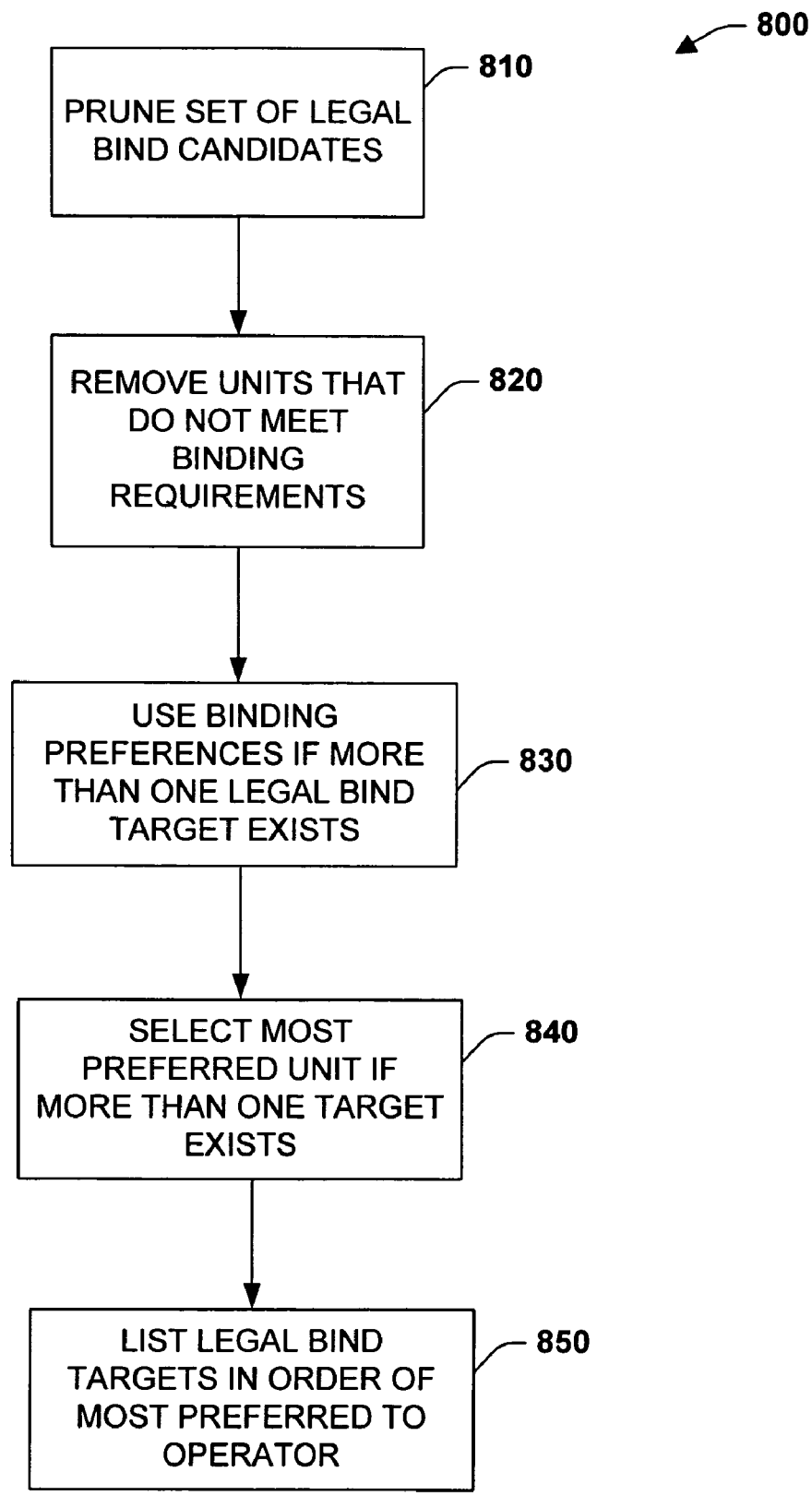
FIG. 8 illustrates an example interface for entering phase parameters in accordance with an aspect of the present invention.

FIG. 8 illustrates a process 800 for batch processing functionality in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

In general, the Batch Server employs the Unit Attribute data generated by the Equipment Editor and the Binding Requirements and Binding Preference data generated by the Equipment Editor and Recipe Editor when binding Unit Requirement objects to Units. When the Batch Server binds a Unit Requirement, it can execute the following process: At 810, prune the set of legal bind candidates by examining flow path and material track requirements. This uses already existing algorithms within the Batch Server. At 820, if more than one legal bind target remains after 810, then prune the set of legal bind targets by examining the Global Binding Requirements and the Binding Requirements of the Unit Requirement. Remove any units that do not meet all of the Binding Requirements. At 830, if more than one legal bind target remains after 820, then sort and sub-sort the set of legal bind targets by using the Binding Preferences of the Unit Requirement. If no legal bind targets remain after executing 810 and 820 of the bind process 800, then the Batch Server can execute appropriate error handling.

When the set of legal bind targets has been trimmed and sorted, the Batch Server now has a prioritized list of legal bind targets that can be used in the following manner, depending on the form of binding being executed: At 840, First Available Binding: If more than one legal bind target in the set is currently available, then the "most preferred" Unit will be used. At 850, optionally apply Operator Prompt: if a binding prompt is displayed to the operator, then the legal bind target Units can be listed in sorted order with the "most preferred" bind target first, and the "least preferred" bind target last.

Figure 9:
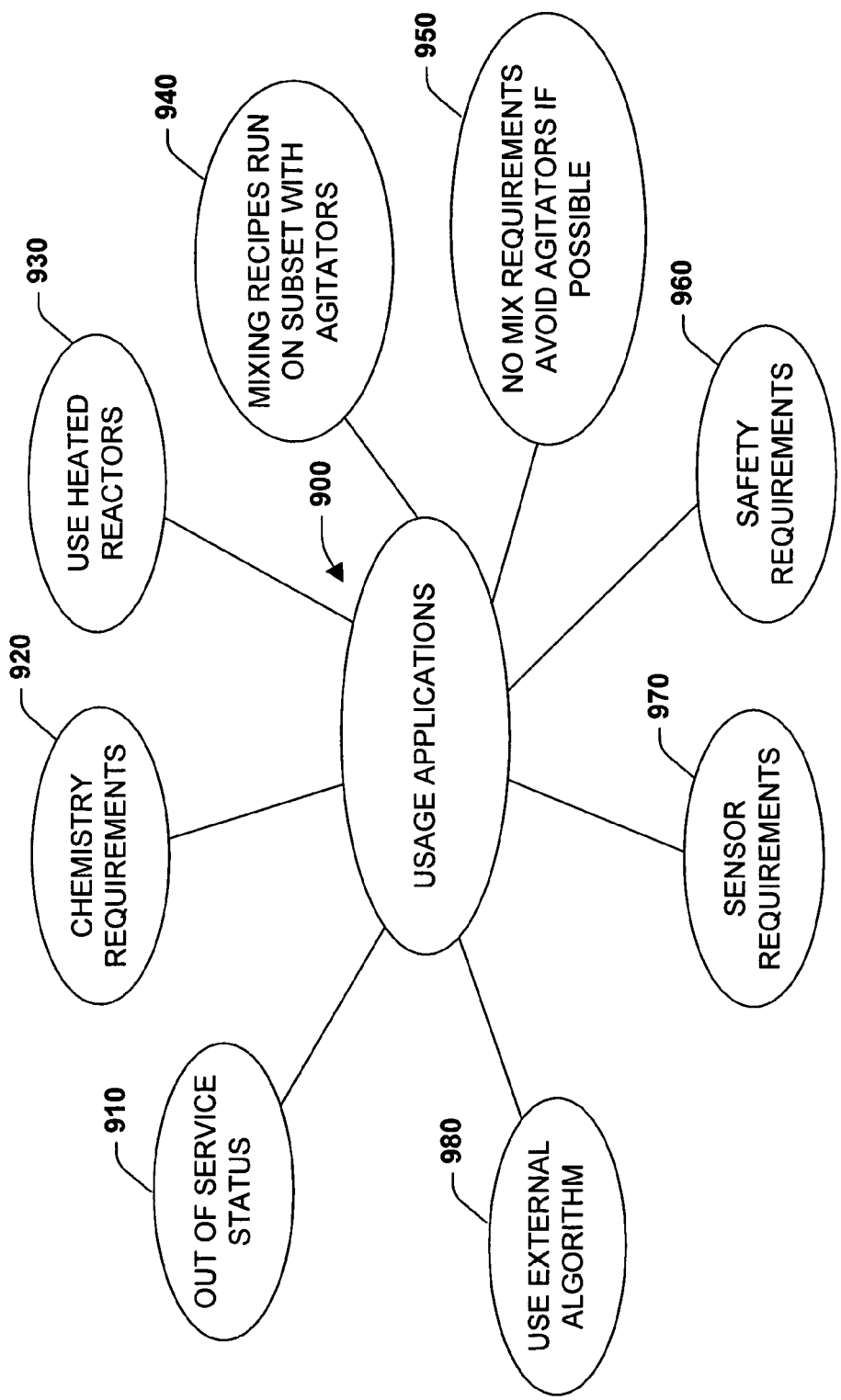
FIG. 9 illustrates example usage applications in accordance with an aspect of the subject invention.

FIG. 9 illustrates example usage applications 900 in accordance with an aspect of the present invention. At 910, attributes and rules can be utilized to provide an out of service status that can be associated with a unit or units. Units that are out of service would not be legal bind candidates for class-based recipes. At 920, chemistry considerations are processed. In this case, a set of recipes could be restricted to only using glass-lined reactors for example. At 930, temperature considerations can be processed, wherein a custom unit attribute can be programmed to force recipes to bind to the warmest reactor to facilitate energy savings. At 940, recipes can be restricted to only bind to reactors that support a required agitation phase. At 950, a restriction can be programmed wherein recipes that do not need agitation are prevented from tying up reactors having agitators if possible. At 960, certain recipes can be restricted from running on a subset of equipment if safety concerns are present. For instance, certain chemicals cannot be agitated and should be prevented from being processed in reactors having agitators. At 970, certain reactors can be included or excluded as binding candidate depending on whether or not an associated sensor such as a temperature sensor is present. At 980, users can opt to allow an external algorithm to be applied to facilitate determinations of binding candidates, wherein these algorithms can access attribute objects if necessary.

What have been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for automated industrial processing, comprising:
 a processor that determines one or more attributes of a class-based recipe to facilitate automated industrial control operations; and
 a rules component to resolve how the attributes are applied by the processor to facilitate the automatic selection of equipment or processes during runtime, wherein the rules include at least one of a recipe phase exclusion and a unit attribute exclusion.

2. The system of claim 1, the rules component further comprises a binding component.

3. The system of claim 2, the binding component includes a binding requirements component and a binding preferences component.

4. The system of claim 1, the attributes describe a subset of functionality that applies to members of a class.

5. The system of claim 1, further comprising an equipment editor and a recipe editor facilitate programming of attribute-based binding and equipment selection.

6. The system of claim 5, further comprising a component to restrict a set of members of a Unit class on which a class based recipe can run or a component to specify an algorithm for determining a most preferred unit to be used by a recipe when more than one member of the Unit Class satisfies one or more restriction requirements.

7. The system of claim 1, the attributes further comprise at least one of a unit attribute and an equipment phase attribute.

8. The system of claim 7, the unit attribute further comprises at least one of a standard unit attribute and a custom unit attribute.

9. The system of claim 1, the attributes are associated with at least one of a unit attribute tag and an equipment phase attribute tag.

10. The system of claim 9, unit attribute tag and the equipment phase attribute tag are associated with static or dynamic properties.

11. The system of claim 1, farther comprising a global tag or a global binding requirement.

12. The system of claim 1, farther comprising a binding requirement that includes a Boolean expression, a recipe phase inclusion, a recipe phase exclusion, a unit attribute inclusion, or a unit attribute exclusion.

13. The system of claim 1, farther comprising a binding preference that includes a Boolean expression, a maximize expression, a minimize expression, a recipe phase inclusion, a recipe phase exclusion, a unit attribute inclusion, or a unit attribute exclusion.

14. The system of claim 1, farther comprising a user interface for entering one or more binding requirements.

15. The system of claim 14, further comprising a type column to specify a type requirement.

16. The system of claim 15, further comprising an expression editor that assists users in building expressions for "Expression" type binding requirements.

17. The system of claim 1, further comprising a user interface for entering one or more binding preferences.

18. The system of claim 17, the user interface allows users to promote or demote a sort order of Binding Preferences.

19. The system of claim 1, the attributes are applied to at least one of an out of service status, a lined vessel status, a heated vessel status, an agitator status, a safety requirement status, a sensor status, and an external algorithm status.

20. A method for performing automated batch processing comprising:
 defining one or more attributes for members of a class;
 applying one or more rules for selecting members of the class, wherein the rules include at least one of a recipe phase exclusion and a unit attribute exclusion;
 binding to a subset of available equipment based upon the rule and the attribute; and
 selecting which of a plurality of equipment or processes to run based on the binding.

21. The method of claim 20, further comprising preference rules to resolve disputes between the one or more rules.

22. The method of claim 20, further comprising determining if more than one legal bind target remains after a trimming operation, then trimming a set of legal bind targets.

23. The method of claim 20, further comprising determining if more than one legal bind target exists and sorting a set of legal bind targets by using at least one Binding Preference of a Unit Requirement.

24. The method of claim 20, further comprising applying a first available binding if more than one legal bind target in a set is currently available, then employing a most preferred Unit as determined by at least one user-defined Binding Preference.

25. The method of claim 20, further comprising automatically prompting an operator with a set of binding targets.

26. A system for performing automated batch processing comprising:
 means for processing one or more attributes for members of an equipment class;

means for declaring one or more rules for controlling members of the equipment class, wherein the rules include at least one of a recipe phase exclusion and a unit attribute exclusion;

means for resolving logical disparities between the rules;

means for binding to a subset of available equipment associated with the equipment class based upon the rules and the attribute; and means for selecting which of a plurality of available equipment to run based on the binding.

27. A computer readable storage medium having a data structure stored thereon for controlling an industrial batch process, comprising:

at least one attribute field relating to members of an equipment class;

at least one rules field adapted to apply the attribute to the equipment class; and at least one preference field to resolve differences between the rules, at least one recipe phase exclusion field to group members of the equipment class that support an undesired recipe phase.

28. The data structure of claim 27, further comprising a field describing at least one of an attribute name, a type, an enumeration set, an engineering unit, a default value, a description, an identification, and a global flag.

* * * * *